Figure 1:
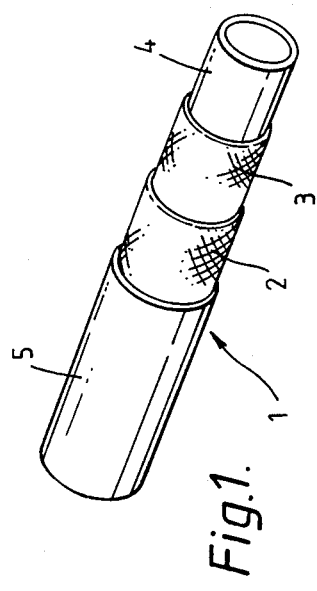

United States Patent [19]   [11] Patent Number: 4,891,179
Peacock et al.   [45] Date of Patent: Jan. 2, 1990

[54] METHOD OF CONSOLIDATING COMPOSITE ARTICLES

[75] Inventors: Donald G. Peacock, Paradise; Stanley W. Kirkham, Swindon, both of England

[73] Assignee: Textilver S.A., Crepy-en-Valois, France

[21] Appl. No.: 118,381

[22] Filed: Nov. 6, 1987

[30] Foreign Application Priority Data

Dec. 22, 1986 [GB] United Kingdom ............... 8630552

[51] Int. Cl.$^4$ ................ B29C 43/22; B29C 43/30
[52] U.S. Cl. .................... 264/565; 264/166;
264/173; 264/257; 264/258; 264/314; 425/89;
425/112; 425/389; 425/DIG. 19
[58] Field of Search ............ 264/166, 257, 314, 324,
264/338, 565, DIG. 50, 258, 173; 425/89, 112,
389, DIG. 19, DIG. 41, DIG. 44

[56] References Cited

U.S. PATENT DOCUMENTS

| 2,554,356 | 5/1951 | Beare | 264/317 |
| 2,756,458 | 7/1956 | Krupp et al. | 264/166 |
| 3,041,660 | 7/1962 | Fink | 264/257 X |
| 3,185,747 | 5/1965 | Boggs | 264/209.6 X |
| 3,253,618 | 5/1966 | Cook | 138/125 |
| 3,253,619 | 5/1966 | Cook et al. | 138/125 |
| 4,312,917 | 1/1982 | Hawley | 264/174 |
| 4,462,946 | 7/1984 | Goldsworthy | 264/257 X |
| 4,715,923 | 12/1987 | Knoll | 425/389 X |

FOREIGN PATENT DOCUMENTS

| 185460 | 6/1986 | European Pat. Off. |
| 3128384 | 1/1983 | Fed. Rep. of Germany |
| 1441623 | 5/1966 | France |
| 56-133137 | 10/1981 | Japan | 264/257 |
| 56-144925 | 11/1981 | Japan | 264/257 |
| 59-145117 | 8/1984 | Japan | 264/257 |
| 61-35228 | 2/1986 | Japan |
| 1450448 | 10/1976 | United Kingdom |

Primary Examiner—Jeffery Thurlow
Assistant Examiner—Leo B. Tentoni
Attorney, Agent, or Firm—John T. Synnestvedt; Charles H. Lindrooth

[57] ABSTRACT

A method of consolidating a tubular composite article of polymeric matrix material and fibrous reinforcing material, comprising enclosing a length of the tubular composite article in a tubular protective member and advancing the protective member to carry the length of the article thus enclosed through a consolidation zone wherein the article is progressively subjected to consolidating temperature and pressure. The method enables the composite to be pulled through the consolidation zone without the distortion which tends to occur in standard "pultrusion" methods owing to surface friction and longitudinal tension on the composite.

6 Claims, 2 Drawing Sheets

U.S. Patent    Jan. 2, 1990    Sheet 1 of 2    4,891,179

METHOD OF CONSOLIDATING COMPOSITE ARTICLES

This invention relates to a method of consolidating tubular composites of polymeric matrix material and fibrous reinforcing material.

Published European Patent Application No. 0185460 describes consolidation of a fibre/polymer composite either by moulding piece by piece, or by in-line pultrusion methods. Pultrusion processes generally consist of pulling continuous rovings and/or continuous glass mats through a resin bath or impregnator and then through preforming fixtures where the composite is partially shaped and excess resin and/or air are removed, and then into heated dies where the composite is cured continuously (see "Handbook of Pultrusion Technology", by Raymond W Meyer, Pub. Chapman and Hall). Pultrusion methods tend to distort the arrangement of the fibrous reinforcement in the composite, especially when the matrix polymer is of relatively high viscosity and relatively high pulling forces are exerted.

The present invention is concerned with in-line consolidation of composites in which distortion is reduced and the strength and other properties of the consolidate composites may be enhanced.

The invention accordingly provides a method of consolidating a tubular composite article of polymeric matrix material and fibrous reinforcing material, comprising enclosing a length of the tubular composite article in a tubular protective member and advancing the protective member to carry the length of the article thus enclosed through a consolidation zone wherein the article is progressively subjected to consolidating temperature and pressure.

By thus advancing the protective tubular member to carry the composite article, the invention makes it possible to pass the article through the consolidation zone, for example by pulling the protective member, in such a manner as to keep the composite article substantially free from longitudinal distortion such as might be caused for example by longitudinal tension. Moreover, the protective member bears any exterior frictional forces, for example from sliding contact with a heated wall defining the consolidation zone, thus reducing the likelihood of displacement of reinforcing fibres at the surface of the composite article. Suitable choice of low-friction material for the protective member can thus reduce substantially the power required to bring the article through the consolidation zone. Glass cloth coated with polytetrafluoroethylene (PTFE) is especially useful in this connection, although other materials having adequate tensile strength and acceptable frictional characteristics could also be used.

Although pre-formed tubes, or pairs of half-tubes, of suitable materials could be used as the protective member, advantageous continuous processes can best be achieved using flexible sheets or tapes, for example where the protective member comprises at least one sheet which is progressively wrapped around the tubular composite article as it is being fed into the consolidation zone. In such processes, preferably the protective member sheet(s) is or are progressively unwrapped from the composite article after it emerges from the consolidation zone, and although the protective sheets or tapes could be discarded after such use, it is preferred that the protective member sheet(s) is or are in the form of a continuous loop which, on being unwrapped from the composite article, is or are progressively returned to be wrapped around another length of the article being fed into the consolidation zone. In these ways, effective continuous processing may be achieved at rates of feed which are commercially acceptable at least for high-performance composites in which uniformity of consolidation and freedom from pinholes or localised weaknesses are important.

The consolidating pressure may be applied in any convenient manner, preferably by pressurisation of a gas-retaining member within the tubular composite so as to press the wall of the composite against a surrounding, preferably heated, tubular member within, or defining, the consolidation zone. The pressurisable gas-retaining member may be a temporary or permanent liner for the composite which emerges with the composite from the consolidation zone, or may be an "inflatable mandrel" over which the composite slides continuously (e.g. with suitable lubrication) within the consolidation zone, or which moves with the composite through the consolidation zone and is thereafter removed. Such an inflatable mandrel could for example comprise a heat-resistant silicone rubber closed tube and means for inflating it, for example a metal gas pipe extending into the tube through the inlet parts of the consolidation zone. Disruption of the internal surface of the composite by sliding contact with the mandrel will preferably be rendered negligible, or at least acceptable, by suitable mandrel design and operation (e.g. lubrication), given that the outer surface finish is maintained by the wall of the protective member moving with the composite.

The method of this invention can be used to consolidate and cure thermosetting composites, but is advantageous for producing a "reformable" reinforced composite useful in structural high-performance applications. To accomplish this purpose, a reformable composite is produced having fibre-reinforcing material melt-impregnated with a cross-linked thermoplastic polymer. The reformable composite is produced by melt-impregnating fibre reinforcing material with a crosslinkable thermoplastic polymer material to create an intermediate composite, forming under heat and pressure a composite, permitting the thermoplastic material to harden and thereafter cross-linking the polymer by means of further heating, ionizing radiation, or chemical reaction, thereby precluding the polymer from returning to the melt. The composite is thereafter reformable by temperature and by pressure alone. It is specifically preferred within the scope of the invention first to melt-impregnate fibre tows and then to interlace the tows, for example by braiding, weaving, knitting, etc., into a consolidatable composite in the form of a web. An alternative would be to interlace fibre tows into a web and then melt-impregnate and consolidate the web, assuming that adequate wetting and penetration of the web fibres by the impregnating polymer can be achieved, e.g. using suitable known diluents or plasticisers.

Figure 2:
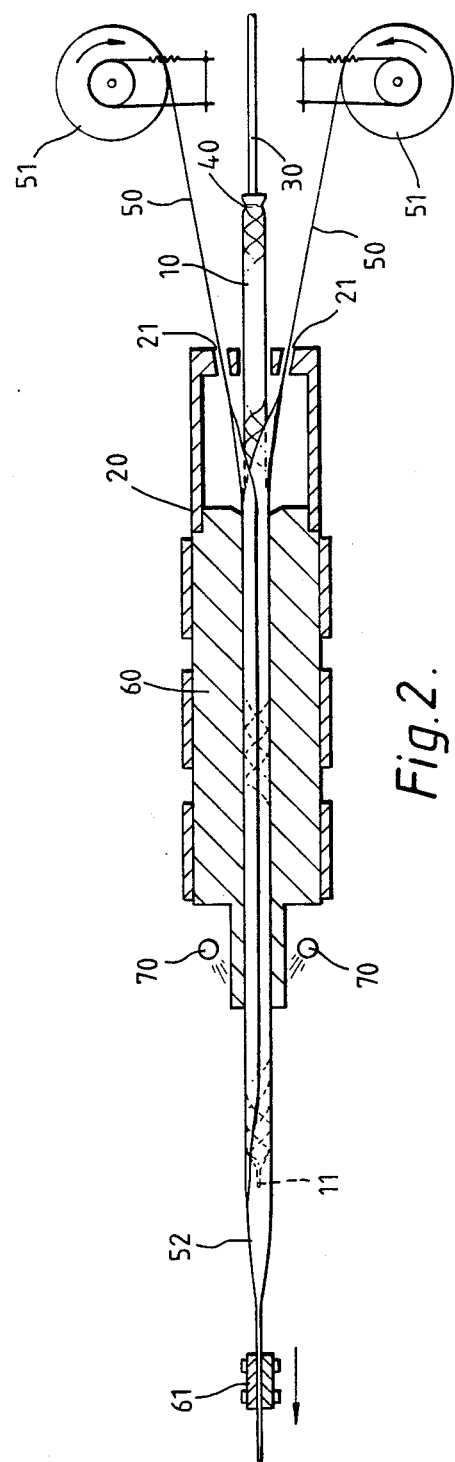
Figure 3:
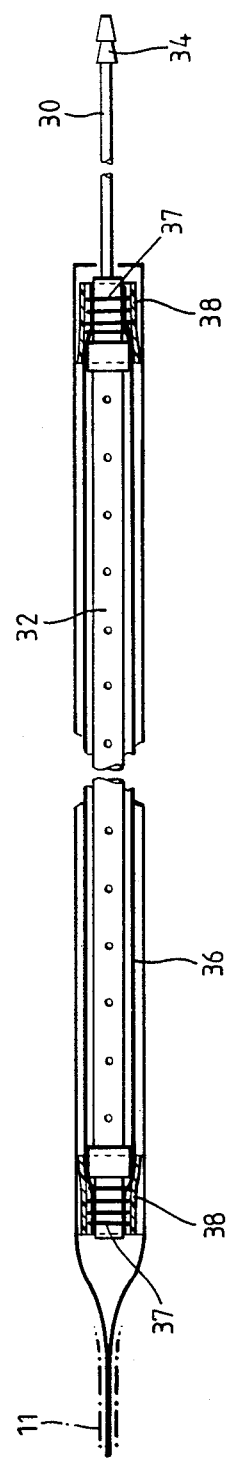

The invention is further illustrated by way of example in the accompanying schematic drawings, wherein FIG. 1 shows a composite fluid duct; FIG. 2 shows one possible form of consolidation apparatus; and FIG. 3 shows one possible form of inflatable mandrel for use in the consolidation process.

With reference to the drawings, FIG. 1 discloses a "semi-finished" duct generally at 1 fabricated from two layers 2, 3 of reformable composite, as described in the aforementioned European Application 0185460, the disclosure of which is incorporated herein by reference. Duct 1 includes a liner 4 inside the duct 1 which is not essential but which is provided where the duct is used as a fluid pressure conduit for low to moderate pressure fluid systems. Duct 1 is also provided with an optional outer cover 5 for environmental protection.

Before describing the specific process used to produce the reformable composite shown in FIG. 1, it is useful to understand that the composite in general may be embodied as a substrate of reinforcing fibre, impregnated with thermoplastic or polymeric matrix material, wherein all of the parts of the substrate are bonded together and are largely free of voids. The reformable nature of the composite is created by crosslinking modification of the polymeric matrix material. This is possible by a process wherein the fibre-reinforcing material is impregnated with the polymer, the melt-impregnated fibre is then woven (or braided) into an intermediate composite and then consolidated into an integrated structure (composite) by meltprocessing using both pressure and heat, whereafter the integrated structure is allowed to cool. The material is then crosslinked either by chemical cross-linking agents activated by heat, or by ionizing radiation to cause cross-linking in the polymeric matrix material, thereby precluding the polymer from returning to the melt. Secondary heating thereafter will cause sufficient softening of the matrix polymer to allow reformability, but the matrix will still tend to maintain its general "as moulded" shape.

Reformable composite 1 is typically made with two layers 2 and 3 of braid on a 48-carrier braider, reinforcement-braided at 54.70 degrees from the longitudinal. Impregnated fibre tow is made using high-performance aramid fibres (Kevlar 49 Trade Mark) impregnated with a matrix material of ethylene/tetrafluoroethylene alternating copolymer (Tefzel 210 Trade Mark) using melt-extrusion techniques. Specifically, fibre is drawn through a cross-head extrusion die modified with special channels which force the fibres to splay apart during coating, thus allowing full penetration by the polymer. The pre-impregnated tows are then braided into a tubular shape, maintaining uniform tension on the tows, at a braid angle of less than 55° from the longitudinal. In this instance, two layers 2 and 3 of the pre-impregnated braid are then passed through a heated tubular female mold with an expansible liner 4 inserted inside the braid. The expansible lining is in this instance extruded Tefzel tube which has been partially cross-linked, and which becomes an integral part of the finished product. It is within the scope of the invention to exclude the liner and this may be accomplished by the use of an expandible and removable mandrel in the manufacturing process. It is also within the scope of the invention to reverse the rigid mold and dimensionally variable mold relationship by having a rigid inner mandrel and an outer resilient member which presses down onto the moving protective member.

Low to moderate pressure (5 to 10 psi) is applied to the inner liner 4 and heat is applied to an outside female mold (not shown). The polymer must be heated above its melt point, which in this instance is approximately 280° C. Care must be taken not to overheat the material and not to heat too large a region. Although this consolidation process is not intended to expand the tubular composite diametrically, it may be useful to allow sufficient movement for the braid angle to reach the "neutral angle" of 54.7°, at which point further diametrical expansion will not occur without mechanical deformation of the fibres. This is the optimum diameter for the final product and thus determines the most appropriate I.D. of the female mold.

After cooling, the consolidated duct is removed from the mold and the inner mandrel is removed if desired, and the duct is rotated under an electron beam to crosslink the polymer. The dose delivered is approximately 2 Mrads, uniform over the duct, but this may be varied in accordance with the kind and amount of cross-linking agents incorporated in the impregnating polymer.

The duct 1, which is now a "semi-finished" duct, may be reformed as desired. Reforming may be accomplished by: (1) Plugging the ends of the duct and pressurizing to approximately 5 to 10 psi (low pressure); (2) locally heating the duct above the melting point of the uncrosslinked polymer (e.g. 280° C. for Tefzel) where the bend is desired and bending either freehand or over a form; (3) cooling the bent section while maintaining the desired shape; and (4) if desired, reforming the already-reformed section by repeating the above steps. Note that the low internal pressure is used to avoid local buckling or kinking.

It is within the scope of the invention to produce and utilize impregnated fibre tow wherein the fibre reinforcement comprises about 10% to 65% (preferably less than about 45%) by volume of the consolidated composite. At substantially higher fibre contents, the composite, after consolidation and cross-linking, tends to tear open and fissure during the reforming operation; while at substantially lower fibre contents the composite after consolidation and cross-linking, tends to be undesirably weak with the result that the size and weight of the article must be substantially increased to carry a given mechanical load, such increase often being unacceptable for example in high-performance applications found, for instance, in the aerospace industry.

It is within the scope of the invention to have reinforcing fibres placed other than at braiding angles, e.g. substantially parallel with the longitudinal axis of the duct, or substantially circumferentially thereof. This will affect the manner in which the duct may be reformed, as will the form in which the reinforcing fibre is provided, e.g. fibre, braid or fabric. It is also within the scope of the invention to combine various reinforcing fibres as well as various textile configurations (braided, woven, knitted, etc.) as desired to produce the desired reinforced composite.

Reinforcing fibres may be other than aramid, for example glass, graphite, boron, metal, ceramic, and other organic fibres. Likewise, matrix materials other than ethylene/TFE copolymers may be used, for example, polyethylene, polyetherimide, polyvinylidene fluoride, or other cross-linkable polymers. Elastomers may be used to produce flexible composites. Polymers, copolymers, polymer blends and mixtures thereof are within the scope of the invention and are referred to generally as thermoplastic polymers which may be crosslinked in accordance with the invention. As mentioned earlier, fibres may be oriented by other than braiding, for example may be woven, knitted, filament-wound or hand-laid. Likewise, as in the case of the duct 10, multiple layers of the oriented fibres may be utilized to provide the structural reinforcement that is desired.

Various methods of cross-linking matrix material are also within the scope of the invention, such as ionizing radiation, heat, or chemical reaction.

In the preferred embodiment of the instant invention, fibre coating must be done by melt-impregnation to ensure sufficient polymer coating and to allow incorporation of typical thermoplastic additives useful for cross-linking the article and providing desirable characteristics such as flame retardation, heat stability, etc.

Finally, it is understood that the final product shape is not confined to tubular cross-sections. Shapes may also include sheets, squares or rectangular cross-sections, T's, channels, rods, L's and I's etc.

The consolidation method according to this invention will now be more specifically described, by way of example, with reference to FIGS. 2 and 3 of the accompanying drawings.

FIG. 2 shows schematically a length of unconsolidated fibre/polymer composite 10 entering the consolidation zone contained within housing 20. A gas supply pipe 30 extends into the tubular composite 10 to supply the consolidating gas pressure to an inflatable mandrel, which will be described later with reference to FIG. 2. The end 40 of the composite is shown closed about the gas pipe (which in this case moves with the composite) to retain the pressure, but it will be appreciated that continuous formation of the tubular composite, e.g. by braiding about a moving or stationary gas pipe, could be effected if suitable means were provided to retain adequate pressure, e.g. some form of rollers to pinch the advancing composite against the pipe. The leading end 11 of the composite is shown permanently closed, but suitably flexible composites could instead be pinched shut temporarily, e.g. by nip rolls, to retain the pressure.

As the composite advances into the consolidation zone, it is progressively enwrapped by protective tapes or sheets 50 of glass cloth coated with PTFE, drawn from feed rolls 51 and passing through guide apertures 21. The protective tapes are used in suitable number, width and thickness for the size of composite being produced, for example three tapes (only two shown for clarity) 3 cm wide and 0.2 millimeters thick for a 2.5 cm diameter composite. The tapes overlap so as to surround the composite 10 completely and to allow for any slight expansion as aforementioned in settling a braided composite into the neutral braid angle. The protective tapes are here shown in a "one-pass" arrangement, which could be replaced as aforementioned by a continuous loop feedback system if desired.

Within the consolidation zone, the composite and its enclosing protective tapes pass as shown in FIG. 2 into a tubular mold 60, shown in cross-section, which is of appropriate diameter and is heated to a temperature suitable for the consolidation of the composite. The protective tapes tend to reduce the rate of heat transfer into the composite, but an acceptable balance of mold temperature and speed of throughput can be struck by simple trial and error.

The leading ends 52 of the protective tapes 50 are pulled by suitable drive means to draw the wrapped composite through the consolidation zone, suitable means being provided for gripping the tapes, e.g. some form of clamp 60 is illustrated. The consolidated composite emerging from the consolidation zone is cooled, for example by cold air blasts from nozzles 70, whereafter the tapes 50 may be unwrapped from the composite and discarded or re-used as aforesaid. In the illustrated version of the process, discrete lengths of consolidated composite e.g. about 3 meters in length, may conveniently be produced.

FIG. 3 shows one version of an inflatable mandrel within the composite 10, with the protective tapes 50 omitted for clarity. The leading end 11 of the composite is shown closed as before, which would be necessary to retain the pressure if the liner of the composite structure shown in FIG. 1 were to be used to apply the consolidating pressure. However, the mandrel shown in FIG. 3 comprises a perforated metal pipe 32 supplied with gas via gas pipe 30, which has a suitable connection 34 for attachment to a gas supply, and a resilient gas-retaining cover 36 of suitable material, for example heat-resistant silicone rubber. The ends of the cover 36 are secured to the tube 32, in this example by wire binding 37, 37 overlaid by glass cloth insulating tape 38 (shown in section for clarity). The assembly is shown broken and shortened in the middle, a typical assembly in practice being more than three meters in length.

In use, the cover 36 is inflated by gas pressure supplied via pipe 30 and expands to press against the interior surface of the composite 10, compressing the composite and the moving tapes 50 against the heated mold 60 shown in FIG. 2 to effect consolidation. Thus, the inflatable mandrel shown in FIG. 3, having its own gas-retaining layer, does not require gas-tight closure of the ends of the composite 10. With attention to the design of the securing means 37, 38 for the ends of the cover 36 to avoid unacceptable friction, the illustrated mandrel could be rendered suitable for stationary operation with the suitably lubricated composite sliding over it. The version shown, however, is better suited to moving with the composite, which can thus be produced conveniently in three-meter lengths.

As an alternative to the internal pressurisation processes described above, the consolidating pressure could be applied by (preferably heated) fluid acting on the outside of the protective member to press the composite against a suitable rigid internal mandrel, or fluid pressure could be applied both internally and externally to consolidate the composite.

We claim:

1. A method of consolidating a tubular composite article of polymeric matrix material and fibrous reinforcing material, comprising completely enclosing a length of the tubular composite article in a tubular protective carrier member and maintaining the tubular composite article substantially free from longitudinal forces by advancing the protective carrier member to carry the length of the article thus enclosed through a consolidation zone wherein the article is progressively subjected to consolidating temperature and pressure, wherein the protective carrier member comprises at least one sheet which is progressively wrapped around the tubular composite article as it is being fed by the protective carrier member into the consolidation zone.

2. A method according to claim 1, wherein the protective member sheet(s) is or are progressively unwrapped from the composite article after it emerges from the consolidation zone.

3. A method according to claim 2 wherein the protective member sheet(s) is or are in the form of a continuous loop which, on being unwrapped from the composite article, is or are progressively returned to be wrapped around another length of the article being fed into the consolidation zone.

4. A method of consolidating a tubular composite article of polymeric matrix material and fibrous reinforcing material, comprising:

(a) completely enclosing a length of the tubular composite article within a tubular protective member;

(b) pulling the protective member to carry the tubular composite article through a consolidation zone in which the article is progressively subjected to consolidating temperature and pressure, the protective member being so pulled that the composite article is kept substantially free from longitudinal tension.

5. A method as claimed in claim 4, in which the fibrous reinforcing material comprises a tube of braided fibers.

6. A method as claimed in claim 4 which comprises internally supporting the tubular composite article by an inflatable mandrel at least in the consolidation zone.

* * * * *